US009235986B2

(12) United States Patent
Drimusz et al.

(10) Patent No.: US 9,235,986 B2
(45) Date of Patent: Jan. 12, 2016

(54) UNIVERSAL REMOTE CONTROL PROGRAMMING

(75) Inventors: Laszlo Otto Drimusz, Framingham, MA (US); Kenneth S. Lyons, Middleboro, MA (US)

(73) Assignee: Bose Corporation, Framingham, MA (US)

( * ) Notice: Subject to any disclaimer, the term of this patent is extended or adjusted under 35 U.S.C. 154(b) by 2206 days.

(21) Appl. No.: 11/626,024

(22) Filed: Jan. 23, 2007

(65) Prior Publication Data

US 2008/0174468 A1 Jul. 24, 2008

(51) Int. Cl.
*H04L 17/02* (2006.01)
*G08C 19/28* (2006.01)

(52) U.S. Cl.
CPC ............ *G08C 19/28* (2013.01); *G08C 2201/92* (2013.01)

(58) Field of Classification Search
CPC ........................................................ G08C 19/28
USPC ................ 341/176, 173; 340/825.69, 825.07, 340/825.22, 825.56, 825.57
See application file for complete search history.

(56) References Cited

U.S. PATENT DOCUMENTS

| | | | | |
|---|---|---|---|---|
| 4,623,887 | A * | 11/1986 | Welles, II | 340/12.24 |
| 4,626,848 | A | 12/1986 | Ehlers | |
| 4,802,114 | A * | 1/1989 | Sogame | 703/23 |
| 4,856,081 | A | 8/1989 | Smith | |
| 4,857,898 | A | 8/1989 | Smith | |
| 4,905,279 | A * | 2/1990 | Nishio | 455/352 |
| 5,028,919 | A | 7/1991 | Hidaka | |
| 5,142,398 | A | 8/1992 | Heep | |
| 5,416,535 | A * | 5/1995 | Sato et al. | 348/706 |
| 5,552,917 | A | 9/1996 | Darbee et al. | |
| 5,614,906 | A | 3/1997 | Hayes et al. | |
| 5,640,160 | A * | 6/1997 | Miwa | 341/53 |
| 5,680,115 | A * | 10/1997 | Sim | 340/12.11 |
| 5,819,294 | A * | 10/1998 | Chambers | 340/12.24 |
| 5,910,784 | A | 6/1999 | Lai | |
| 5,949,407 | A * | 9/1999 | Sato | 345/169 |
| 6,097,309 | A * | 8/2000 | Hayes et al. | 340/12.23 |
| 6,127,941 | A * | 10/2000 | Van Ryzin | 340/4.37 |
| 6,157,319 | A | 12/2000 | Johns et al. | |

(Continued)

FOREIGN PATENT DOCUMENTS

| | | |
|---|---|---|
| CN | 1639753 | 7/2005 |
| EP | 0 223 307 | 5/1987 |

(Continued)

OTHER PUBLICATIONS

Harmony Remote Control User Manual—600 Series. [retrieved on Jul. 28, 2006] Retrieved from the Internet: URL: http://www.logitech.com.

(Continued)

*Primary Examiner* — Amine Benlagsir
(74) *Attorney, Agent, or Firm* — Bose Corporation

(57) ABSTRACT

An apparatus and method for programming a universal remote control. The method includes receiving a transmitted signal of unknown modulation technique from a native remote control and characterizing the received signal in parameters of a pre-determined modulation technique.

4 Claims, 17 Drawing Sheets

(56) References Cited

U.S. PATENT DOCUMENTS

| | | | | |
|---|---|---|---|---|
| 6,219,164 | B1 | 4/2001 | Morgaine | |
| 6,249,673 | B1 * | 6/2001 | Tsui | 455/92 |
| 6,538,595 | B1 | 3/2003 | Tucker et al. | |
| 6,556,813 | B2 * | 4/2003 | Tsui | 455/92 |
| 6,747,568 | B1 | 6/2004 | Teskey | |
| 6,879,351 | B1 | 4/2005 | Brown | |
| 6,909,378 | B1 * | 6/2005 | Lambrechts et al. | 340/825.22 |
| 7,064,675 | B2 | 6/2006 | Zigmond et al. | |
| 7,218,243 | B2 | 5/2007 | Hayes et al. | |
| 7,254,368 | B1 | 8/2007 | Okada et al. | |
| 7,532,258 | B1 * | 5/2009 | Galgano | 348/734 |
| 7,579,961 | B2 * | 8/2009 | Krzyzanowski et al. | 340/12.25 |
| 7,586,398 | B2 | 9/2009 | Huang et al. | |
| 2003/0163542 | A1 * | 8/2003 | Bulthuis et al. | 709/208 |
| 2003/0189509 | A1 | 10/2003 | Hayes et al. | |
| 2004/0070491 | A1 | 4/2004 | Huang et al. | |
| 2004/0076153 | A1 * | 4/2004 | Hallenbeck | 370/389 |
| 2005/0052423 | A1 | 3/2005 | Harris et al. | |
| 2006/0007015 | A1 * | 1/2006 | Krzyzanowski et al. | 340/825.72 |
| 2006/0092037 | A1 | 5/2006 | Neogi et al. | |
| 2007/0061028 | A1 | 3/2007 | Janik | |
| 2008/0088495 | A1 | 4/2008 | Kawakita | |
| 2008/0151119 | A1 | 6/2008 | Suzuki | |
| 2008/0198059 | A1 | 8/2008 | Harris et al. | |
| 2010/0269137 | A1 | 10/2010 | Nakajima et al. | |

FOREIGN PATENT DOCUMENTS

| | | |
|---|---|---|
| EP | 0 974 944 | 1/2000 |
| EP | 0974944 | 1/2000 |
| EP | 1 450 329 | 8/2004 |
| EP | 1450329 | 8/2004 |
| GB | 2419446 | 4/2006 |
| JP | 2007184824 | 7/2007 |
| JP | 2008053983 | 3/2008 |

OTHER PUBLICATIONS

International Search Report and Written Opinion dated Jun. 19, 2008 from International Application No. PCT/US2008/051291.

Extended Display Identification Data from Wikipedia, the Free Encyclopedia. http://en.wikipedia.org/wiki/EDID downloaded Aug. 6, 2008.

High-Definition Multimedia Interface—Wikipedia, the Free Encyclopedia. http://en.wikipedia.org/wiki/HDMI downloaded Aug. 6, 2008.

International Preliminary Report on Patentability dated Jan. 20, 2009 from International Application No. PCT/US2008/051291.

International Preliminary Report on Patentability dated Apr. 24, 2009 for PCT/US2008/051294.

International Search Report and Written Opinion in Application No. PCT/US2008/051294, dated Sep. 16, 2008.

International Search Report and Written Opinion dated Oct. 26, 2009 for PCT/US2009/052062.

CN Office Action dated Nov. 17, 2010 for CN Appl. No. 200880002802.9.

EP Communication dated Oct. 6, 2010 for EP Appln. No. 08727813.1.

CN Office Action dated Nov. 26, 2010 for CN Appln. No. 200880002852.7.

International Preliminary Report on Patentability date Feb. 24, 2011 for Int. Appln. No. PCT/US2009/052062.

3rd CN Office Action dated Dec. 14, 2012 for CN Appln. No. 200880002852.7.

CN Office Action dated Mar. 30, 2012 for CN Appln. No. 200880002852.7.

CN Office Action dated Apr. 26, 2012 for CN Appl. No. 200880002802.9.

* cited by examiner

Device Codes

Native Remote Control Indicators

| | D1 | D2 | D3 | D4 | D5 | D6 | D7 | D8 |
|---|---|---|---|---|---|---|---|---|
| 1 | 0001 | 0010 | 0010 | 0010 | 0010 | 0010 | 0010 | 0010 |
| 2 | 0101 | 0011 | 0011 | 0011 | 0011 | 0100 | 0100 | 0100 |
| 3 | 0110 | 0111 | 0111 | 1000 | 1000 | 0111 | 0111 | 1000 |
| 4 | 1001 | 1001 | 1010 | 1010 | 1011 | 1011 | 1100 | 1101 |
| 5 | ... | ... | ... | ... | ... | ... | ... | ... |
| . | | | | | | | | |
| . | | | | | | | | |
| . | | | | | | | | |

FIG. 6

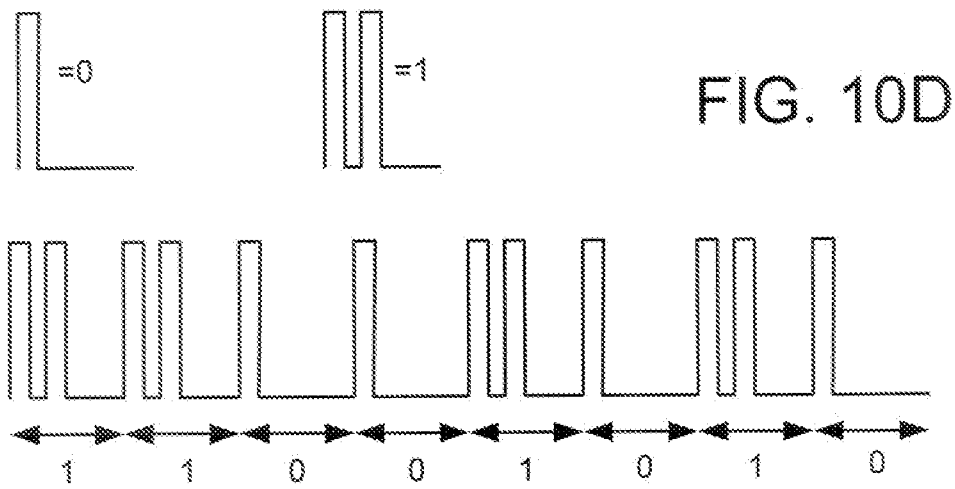
FIG. 10D
FIG. 10E
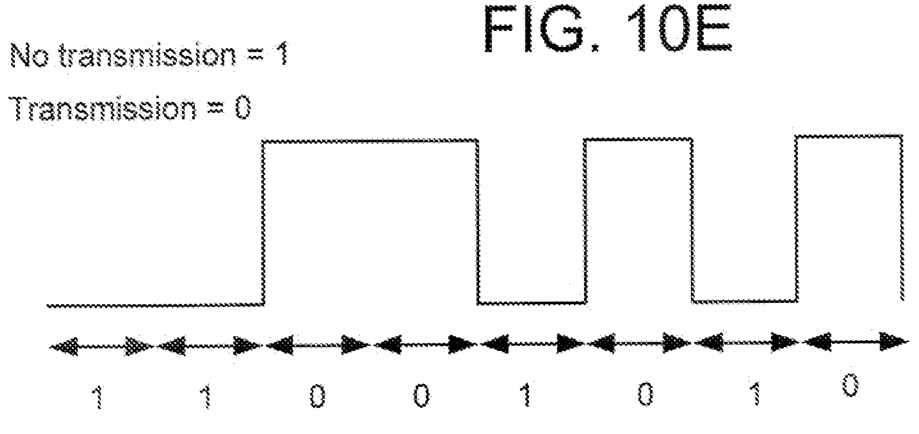

UNIVERSAL REMOTE CONTROL PROGRAMMING

BACKGROUND

This specification describes a universal remote control.

SUMMARY

In one aspect, a method includes interpreting a command signal of unknown modulation technique received from a native remote to provide a command code expressed in parameters of a pre-determined modulation technique. The method may further include comparing the correspondence between the command code and the indicator with a database including command codes expressed in the parameters of the pre-determined modulation technique. The method may further include converting a database including command codes expressed in one of oversampled terms and run length code terms to a database including command codes expressed in parameters of the pre-determined modulation technique. The method may further repeating the interpreting and the comparing until a device code associated with the native remote control is identified. The pre-determined modulation technique may be pulse-width modulation. The parameters of the pre-determined modulation technique may comprise ON and OFF time of a first symbol and. ON and OFF time of a second symbol. The parameters of the pre-determined modulation technique comprise carrier frequency. The method may further include receiving an IR signal. The method may include smoothing successive transmissions of a data portion. The smoothing may include averaging or filtering.

In another aspect, an apparatus includes a signal interpreter for interpreting a command signal of unknown modulation technique from a native remote control to provide a command code expressed in parameters of a pre-determined modulation technique. The signal interpreter may be incorporated in a universal remote control. The apparatus may further include a signal analyzer for comparing the correspondence between the command code and the indicator with a searchable database. The signal interpreter and the analyzer may be in the same physical device. The physical device may be a remote control The physical device may be an audio receiver or head unit. The apparatus may include an IR signal receiver.

In another aspect, a microprocessor readable medium encodes instructions to cause a microprocessor associated with a universal remote control to interpret a command signal of unknown modulation technique from a native remote control, to provide a command code expressed in parameters of a pre-determined modulation technique. The instructions may further cause the microprocessor to compare the correspondence of the command code and an indicator of a native remote control with a searchable database. The instructions may further cause the microprocessor to convert a set of command codes expressed in at least one of oversampled terms and run length code terms to provide a set of command codes expressed in parameters of the pre-determined modulation technique. The instructions may further cause the microprocessor to repeat the instructions causing the microprocessor to interpret and to compare until a device code associated with the native remote control is identified. The pre-determined modulation technique may be pulse-width modulation. The parameters may comprise ON and OFF time of a first symbol and ON and OFF time of a second symbol. The parameters of the pre-determined modulation technique may comprise carrier frequency. The medium may further encode instructions to smooth successive transmissions of a data portion. The instructions to smooth may include instructions to average or filter the successive transmissions.

In another aspect, a method includes interpreting a command signal of unknown modulation technique from a native remote to provide a first command code expressed in parameters of a pre-determined modulation technique; and determining, based on correspondence between the first indicator and the first command code, if a command set of the native remote control can he uniquely identified. The method may further include, in the event that the command set of the native remotecontrol cannot be uniquely identified, repeating the interpreting and the determining until the command set of native remote control is uniquely identified. The method may further include comparing the correspondence between the command code and the indicator with a database including command codes expressed in the parameters of the pre-determined modulation technique. The pre-determined modulation technique may be pulse-width modulation. The parameters of the pre-determined modulation technique may comprise ON and OFF time of a first symbol and ON and OFF time of a second symbol. The parameters of the pre-determined modulation comprise carrier frequency.

In another aspect, a microprocessor readable medium encodes instructions causing a microprocessor to interpret a command signal of unknown modulation technique from a native remote to provide a command code expressed in parameters of a pre-determined modulation technique; and determine, based on correspondence between the first indicator and the first command code, if a command set of the native remote control can be uniquely identified. The instructions may further cause the microprocessor, in the event that the command set of the native remote control cannot be uniquely identified, to repeat the instructions causing the microprocessor to interpret and to determine until the command set of the native remote control is uniquely identified. The instructions may further cause the microprocessor to compare the correspondence between the command code and the indicator with a database including command codes expressed in the parameters of the pre-determined modulation technique. The instructions may further cause the microprocessor to convert a set of command codes expressed in at least one of oversampled terms and run length code terms to provide the plurality of command codes to a set of command codes expressed according to a pre-determined modulation technique. The pre-determined modulation technique may be pulse-width modulation. The parameters of the pre-determined modulation technique may comprise ON and OFF time of a first symbol and ON and OFF time of a second symbol. The parameters of the pre-determined modulation may comprise carrier frequency.

In another aspect, apparatus includes a signal interpreter for interpreting a command signal of unknown modulation technique received from a native remote control to provide a command code expressed in parameters of a pre-determined modulation technique an analyzer for determining, based on correspondence between the first indicator and the first command code, if the command set of the native remote control can be uniquely identified. The signal interpreter and the analyzer may be in the same physical device. The physical device may be a remote control. The physical device may be an audio receiver or head unit. The apparatus may further include an IR sensor for receiving the command signal.

In another aspect, a method for modifying a database including remote control command codes expressed in oversampled form or run-length code form, includes determining unique On/Off sequences in the command codes; expressing each of the unique On/Off sequences in parameters of a modulation technique; and encoding each of the command codes in parameters of the modulation technique. The modulation technique may be pulse-width modulation. The method may further include determining parameters that have common values for each of the command codes in the command set. The parameters include at least one of carrier frequency and carrier duty cycle. The parameters may include at least one of leader On time and leader Off time. The parameters may include inter-code gap time. The parameters may include repeat behavior.

In another aspect a microprocessor readable medium encodes instructions to cause the microprocessor to modify the records of a database of command codes expressed in oversampled form or run-length code form, by determining unique On/Off sequences in the command codes; expressing each of the unique On/Off sequences in parameters of a modulation technique; and encoding each of the command codes in parameters of the modulation technique. The modulation technique may be pulse-width modulation. The instructions may cause the microprocessor to modify the records further by determining parameters that have common values for each of the command codes in the command set. The parameters may include at least one of carrier frequency and carrier duty cycle. The parameters include at least one of leader On time and leader Off time. The parameters may include inter-code gap time.

Other features, objects, and advantages will become apparent from the following detailed description, when read in connection with die following drawing, in which:

BRIEF DESCRIPTION OF THE SEVERAL VIEWS OF THE DRAWING

FIG. 6 is a hypothetical table of command codes and corresponding native remote control indicators;

FIGS. 10A-10E are waveforms illustrating modulation techniques;

DETAILED DESCRIPTION

Figure 1:
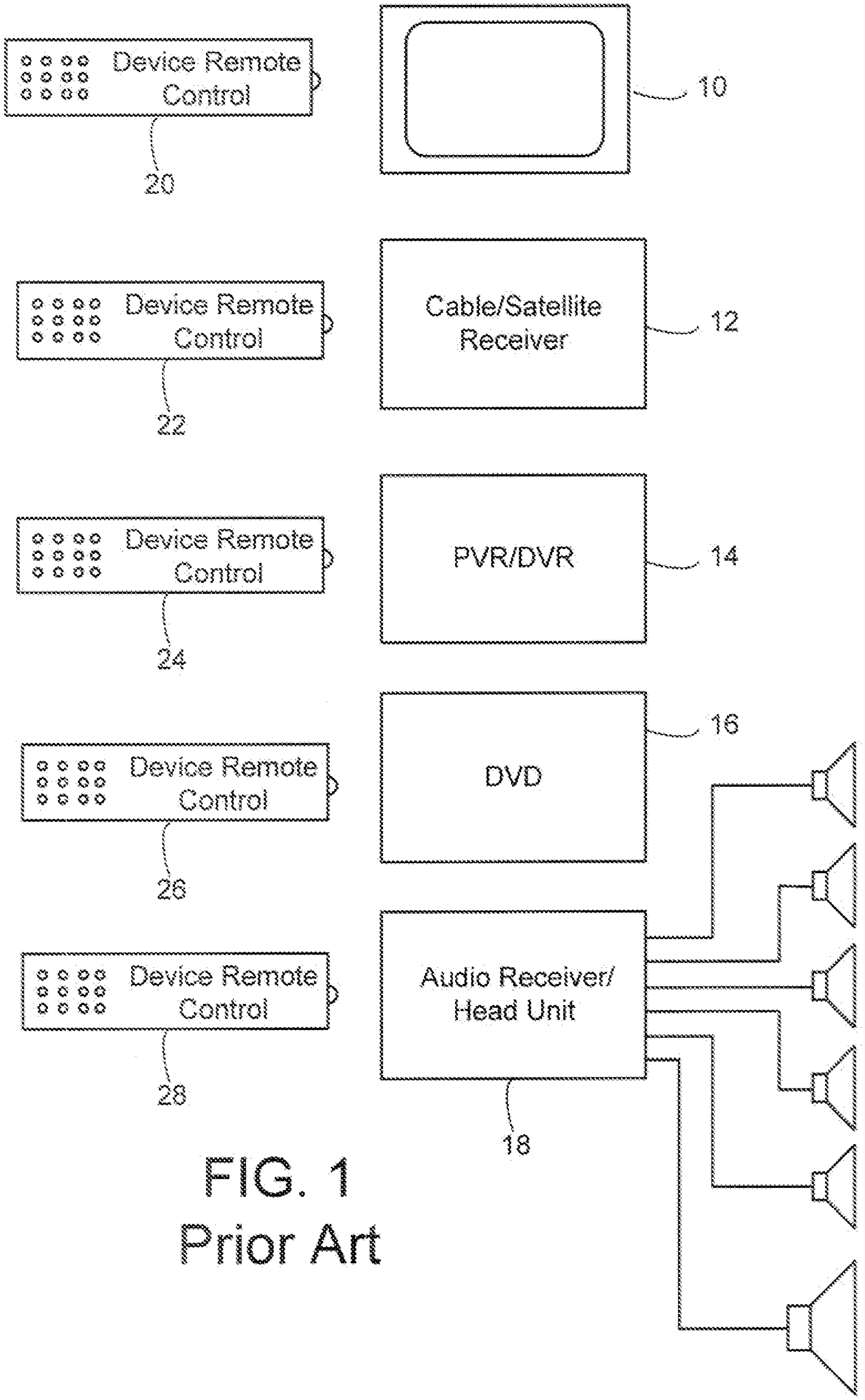
FIG. 1 Prior Art
FIG. 1 is a block diagram of a prior art home entertainment system.

Though the elements of several views of the drawing may be shown and described as discrete elements in a block diagram, and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Unless otherwise indicated, signal lines may be implemented as discrete analog or digital signal lines, as a single discrete, digital signal line with appropriate signal processing to process separate streams of audio signals, or as elements of a wireless communication system. Some of the processing operations may be expressed in terms of the calculation and application of coefficients. The equivalent of calculating and applying coefficients can be performed by other analog or digital signal processing techniques and are included within the scope of this patent application.

Referring to FIG. 1, there is shown a prior art home entertainment system. The home entertainment system includes devices such as a television 10, cable television or satellite television receiver 12, a personal video recorder (PVR) or digital video recorder (DVR) 14, a DVD player 16, and an audio receiver or audio head unit 18. Each of the devices has associated with it a remote control, (hereinafter "native remote control") 20-28 respectively, each of which controls one device. The devices may be interconnected in a number of ways, and the specific interconnections are not shown. The home entertainment system may lack one or more of the components shown in this view, or may have additional components with associated remote controls.

Each of the remote controls has indicators, such as keys, buttons, or graphically indicated regions on a touch screen. Each indicator represents a command, for example, power on/off or volume up. Some indicators may represent a predetermined sequence of commands, typically referred to as "macros." When an indicator is selected, typically by pressing or touching, the native remote control transmits a signal (hereinafter a "command signal") that includes an encoded command (hereinafter "command code") representing the command corresponding to the indicator. For simplicity, the sequence of radiating a command signal that includes an encoded command may be stated as "radiating a command code." The associated device detects and interprets the command signal and executes the command. Each of the native remote controls has a command set, that is, a set of command codes that correspond with specific commands. Several like devices, for example television sets, may have the same command set. Command sets are typically referred to by an identifier called a "device code." For example, "TV 123" may be a device code identifying a set of command codes and associated commands for one or more televisions.

One popular type of remote control is an infrared (IR) remote control. Selecting an indicator on an IR remote control causes the remote control to radiate IR radiation in a characteristic pattern. Use controlled device detects the IR radiation and executes the appropriate command. This specification describes programming a universal IR remote control, that is a remote control that can be programmed to control more than one device. The principles for programming universal remote controls are applicable to other types of remote controls, such as radio frequency (RF) remote controls. In one implementation, the universal remote control is an RF remote control. The universal remote control radiates command signals to the audio head unit, and the audio head unit radiates IR command signals to the other devices.

Figure 2:
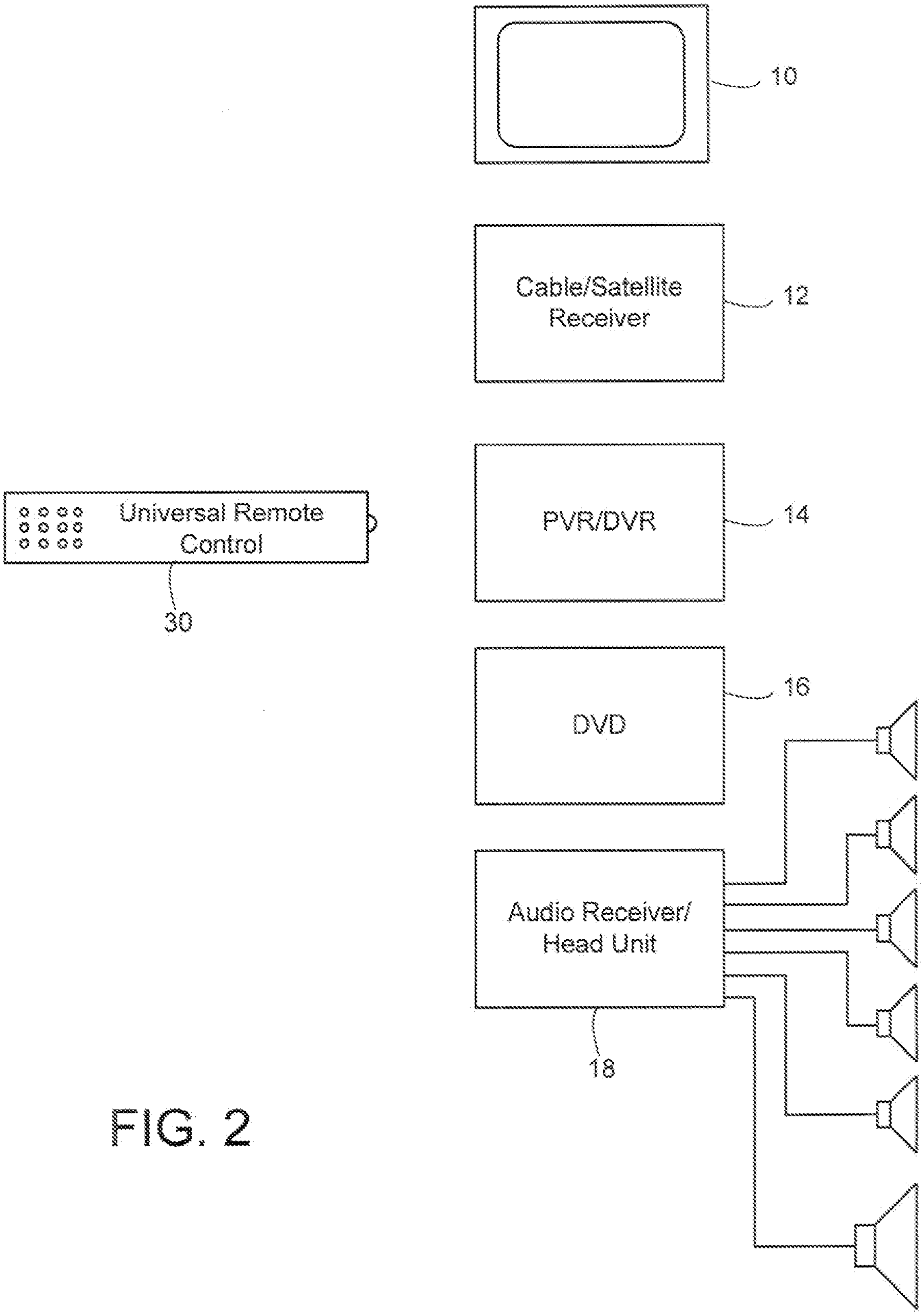
FIG. 2 is a block diagram of a home entertainment system with a universal remote control.

FIG. 2 shows a home entertainment system having some of the elements of FIG. 1, including the television 10, the cable or satellite receiver 12, the PVR/DVR 14, the DVD player 16, and the audio receiver or head unit 18. One or more, in this case all, of the native remote controls 20-28 of FIG. 1 have been replaced by a universal remote control 30. The universal remote control 30 controls the operation of some or all of the components of the home entertainment system. The universal remote control typically has all the same indicators as each of the native remote controls, so that the universal remote control has more indicators than any one of the native remote controls, and in addition may have additional indicators that are assignable or which indicate macros. The universal remote control may also have indicators specifying the type of device being controlled, for example "television" or "cable/satellite box". Having indicators for each of devices controlled permits the universal remote to designate which device is to he controlled in eases in which a command may apply to more than one device, for example turning the power on or off. When an indicator of the universal remote control is selected, the universal remote control radiates the same command signal as the native remote control corresponding to the selected device would radiate. For example, if "television" and "channel up" on the universal remote control are selected, the universal remote control radiates the same command signal as the native remote control associated with the television would have radiated if the "channel up" indicator of the television native remote control were selected.

Figure 3:
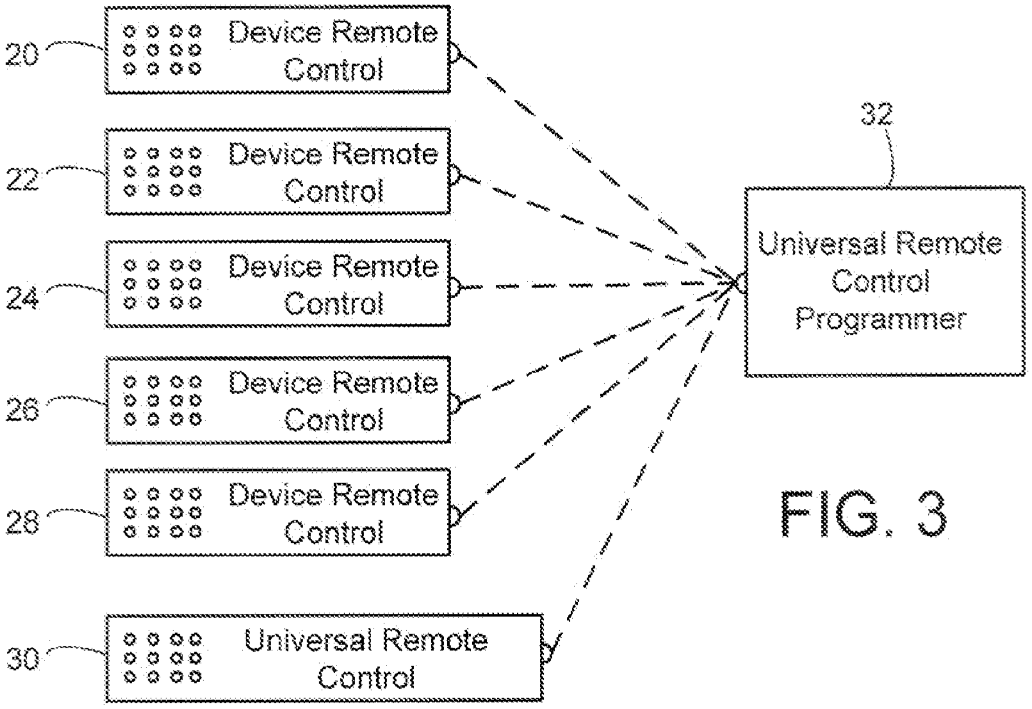
FIG. 3 is a block diagram of elements of a system for programming a universal remote control.

The universal remote control 30 may be a device distinct from the native remote controls as shown, permitting the universal remote control to be designed and marketed as a stand-alone device. Alternatively, the universal remote control may be pre-programmed to control one or mote of the elements of the home entertainment system of FIG. 2, such as the television 10, the cable or satellite receiver 12, the PVR/DVR 14, the DVD player 16, or the audio receiver or head unit 18. This implementation requires the universal remote to be programmed to control fewer devices, eliminates the need for one of the native remotes, and permits at least one of the devices to be used to assist the user in programming the universal remote control. For example, if the universal remote control is pre-programmed to control the audio receiver or head unit 18, the user could initiate the programming procedure by selecting one of the indicators on the universal remote control. The audio receiver or head unit 18 could then respond to the selection of the indicator by issuing audible instructions to the user Since the commandsets differ from device to device, the universal remote control must be programmed so that it can radiate the appropriate IR signal to cause the device to execute the desired command. FIG. 3 shows a system for programming a universal remote control. A universal remote control programmer 32 is operatively coupled with the native remote controls 20-28 (or example, by being able to receive infrared transmissions from the native remote controls). The remote control programmer is also operatively coupled with the universal remote control 30 in some manner such as being able to wirelessly send and receive remote control transmissions to and from the universal remote control or coupled by a cable. The remote control programmer may be a docking station for the universal remote control or may be in the same housing as the remote control and directly connected by circuitry. The universal remote control 30 and the universal remote control programmer 32 will be described below.

Figure 4:
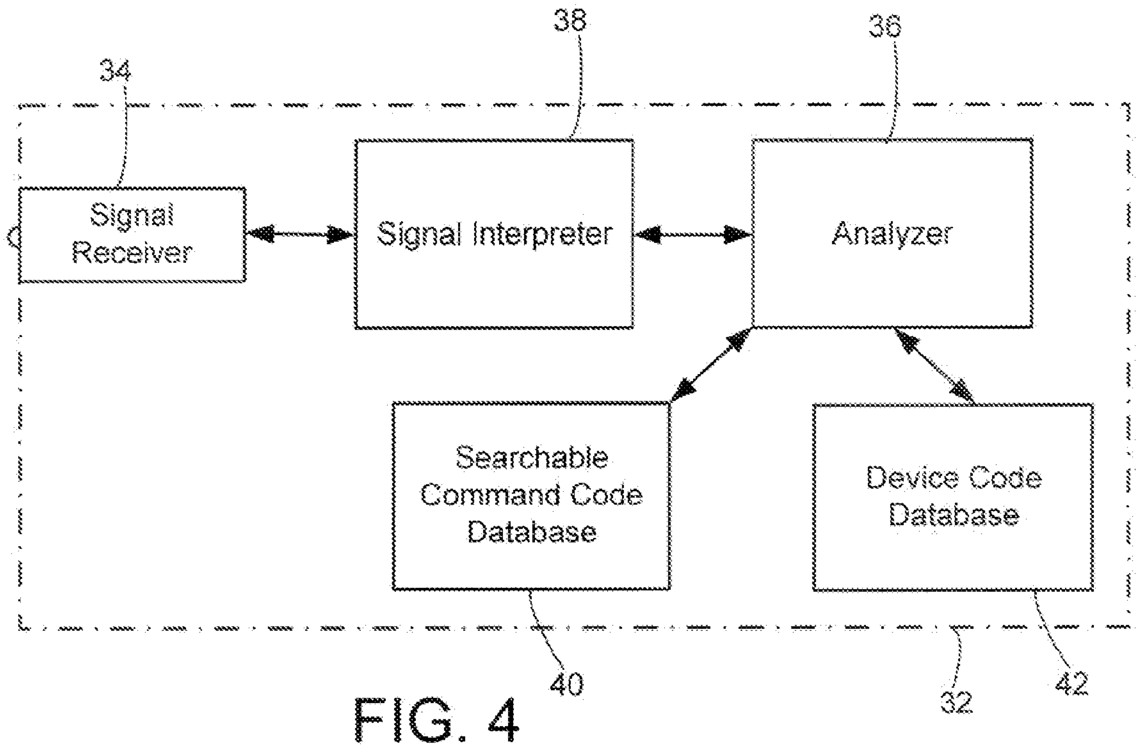
FIG. 4 is a block diagram of a universal remote control programmer.

FIG. 4 shows components of the universal remote control programmer 32. The components include a command signal receiver 34 coupled to an analyzer 36 by a signal interpreter 38. Operatively coupled to the analyzer 36 are a searchable command code database 40, and a device code database 42. The elements of the universal remote control programmer may be in the same physical device as shown, or may be in different physical devices as shown below.

In one embodiment, command signal receiver 34 is an IR sensor and signal interpreter 38 is an IR signal interpreter. Databases 40 and 42 may be separate or may be included in one database. The IR signal interpreter, the searchable command code database, and the device code database will be described below.

Figure 5:
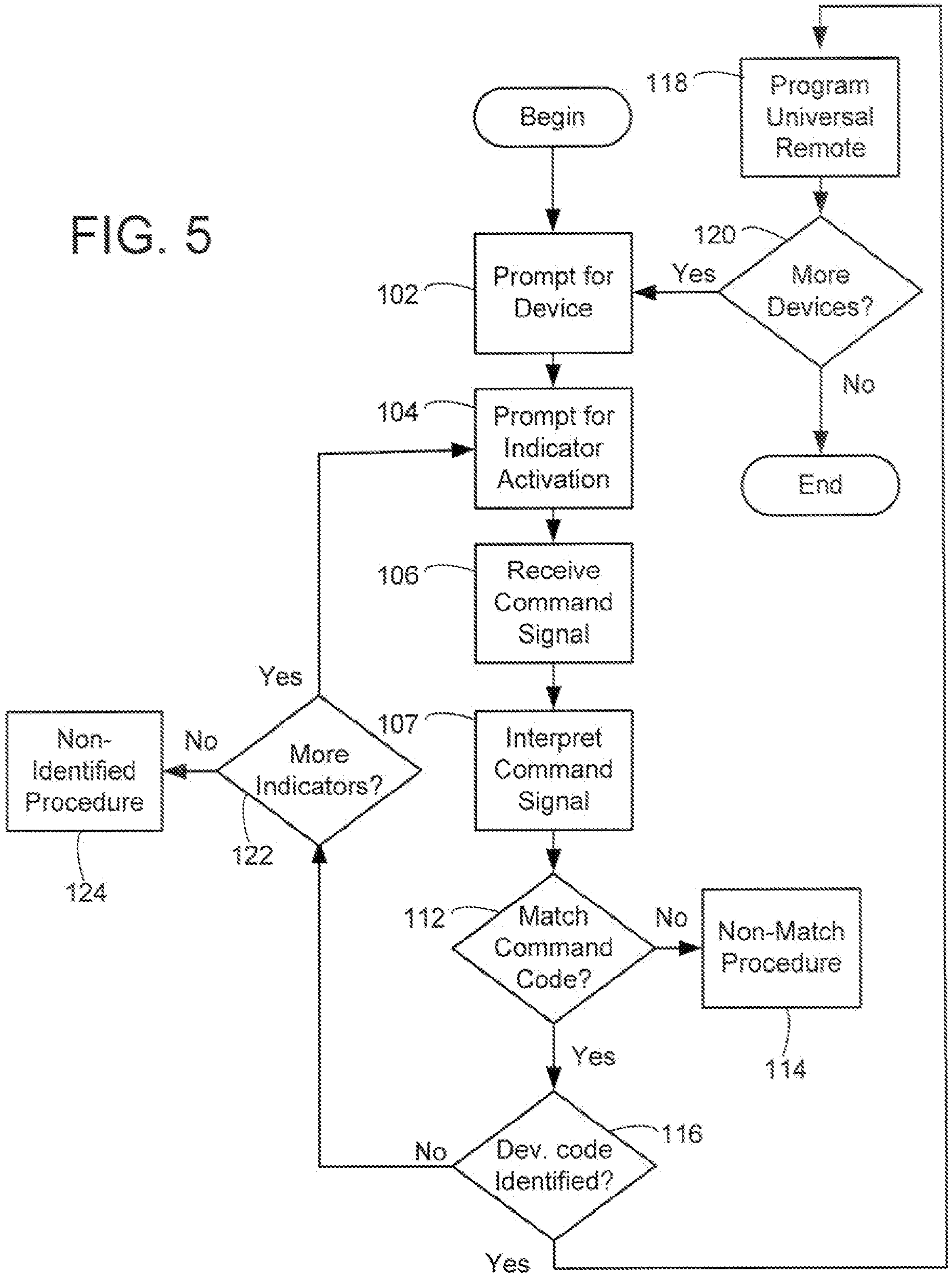
FIG. 5 is a block diagram of a process for operating a universal remote control programmer.

FIG. 5 shows a process for operating the universal remote control programmer 32. At block 102, the user is prompted to begin identifying the device code of the first device. At block 104, the user is instructed to select a specific indicator on the native remote control corresponding to the first device. At block 106, the universal remote control programmer receives the command signal from the native remote control. The command signal is interpreted at block 107 by the signal interpreter 38 of FIG. 4 to provide a command code. The signal interpretation block 107 will be described in more detail below. It is then determined at block 112 if the correspondence between the command code and the indicator matches the command code and the corresponding indicator in the searchable command code database 40 of FIG. 4. If there is no match, the process proceeds to the non-match procedure 114. If there is a match, it is determined at block 116 if the device code has been uniquely identified. The determination block 116 will be described in more detail below. If the device code has not been uniquely identified, the process proceeds to block 122 and it is determined if there are any more indicators, or if some maximum number of indicators have been selected. If there are more indicators or if the maximum number of indicators has not been selected, the process returns to block 104 and the user is prompted to select another indicator. If at block 122 it is determined there are no more indicators or if the maximum number of indicators has been selected, the process proceeds to the non-identified procedure at block 124. If, at block 116, it is determined that the device code has been identified, the process proceeds to block 118, in which the universal remote control is programmed so that the command codes correspond with the indicators in the same manner as the command set corresponding to the device code, so that the universal remote control is programmed to radiate the same command signals as the native remote control for the first device when the same indicator is selected. At block 120, it is determined if there are additional devices with native remote controls to be programmed into the universal remote control. If there are additional devices, the process returns to block 102 and the user is prompted to begin identifying the device code of the next device. If there arc no additional devices, the process is complete.

There are many possible non-match procedures 114. The user may be prompted to re-select the currently selected indicator, the user may be prompted to select another indicator at block 104; the user may be instructed to manually identify the device corresponding to the native remote; the user may be instructed to contact the manufacturer, or some other procedure.

There are also many possible non-identified procedures 124. The user may be instructed to begin the process again at block 102; the user may be instructed to manually identify the device corresponding to the native remote; the user may be instructed to contact the manufacturer; or some other procedure.

The process of FIG. 5 may be controlled and executed by a microprocessor (that may be a part of the universal remote control 30, in the audio receiver or head unit 18, in some other component of the home entertainment system, or may be remote, and coupled through a network connection) as instructions in a software program. The user prompts referred to in blocks 102 and 104 may be communicated visually to the user by a display on the remote control, a display on one of the devices, such as the audio receiver or head unit 18 of FIG. 1, by an on-screen display on television 10, or may be communicated to the user audibly, for example, through the audio components of the home entertainment system. The determination at block 120 and other information or queries may be executed in the form of a question communicated visually to the user through a device display, and on-screen display, or communicated audibly through the audio components of the home entertainment system 2.

FIG. 6 shows a hypothetical table of command codes and device codes for illustrating the process of FIG. 5 especially block 116. The column headers represent different device codes, D1-D8 in this example. The row headers represent indicators on the indicator pad of the native remote control, for example the 1-5 . . . indicators on the numeric indicator pad. The entries in the table (indicated by binary sequences 0001-1101) represent command codes corresponding to the control indicators in the row headers. For example, if the "3" control indicator of device code D4 is selected, the device radiates command code 1000.

For the purpose of these examples, it will be assumed that the command signals match a command code (i.e. that the answers to the query in block 112 of FIG. 5 is YES).

EXAMPLE 1

The user is prompted to select the "1" indicator on the indicator pad of the native remote control. Assume the native remote control radiates a command code 0001, which is received and interpreted by the universal remote control programmer. At block 116, it is determined that the device has been identified, because command code 0001 corresponds to the command associated with indicator pad indicator "1" only in device code Dl. Therefore the device code is D1, and the command set of device code D1 is programmed into the universal remote control. If the answer to query 120 of FIG. 5 is YES, the process proceeds to block 102 and operates in a similar manner for the next native remote control.

EXAMPLE 2

The user is prompted to select the "1" indicator on the indicator pad of the native remote control. Assume the native remote control radiates command code 0010, which is received and interpreted by the universal remote control programmer. At block 116, it is determined that the device has not been Identified, because code 0010 corresponds to indicator pad indicator "1" in any one of device codes D2-D8. Because the answer to the query at block 116 of FIG. 5 is NO, the process proceeds to block 122, where the answer to the query is YES, and the process proceeds to block 104. At block 104, the user is prompted to select the "2" indicator on the indicator pad of the native remote control. Assume the native remote control radiates the command code 0011. At block 116, it is determined that the device has not been identified, because, while devices codes D6-D8 have been eliminated as possibilities, the command codes corresponding to native remote indicator pad indicators "1" and "2" are consistent with any of device codes D2-D5. Because the answer to the query at block 116 of FIG. 5 is NO, the process proceeds to block 322, where the answer to the query is YES, and the process proceeds to block 104. At block 104, the user is prompted to select the "3" indicator on the indicator pad of the native remote control. Assume the native remote control radiates the command code 0111. At block 116, it is determined that the device has not been identified, because, while devices codes D4 and D5 have been eliminated as possibilities, the command codes corresponding to native remote indicator pad indicators "1", "2", and "3" are consistent with device codes D2 and D3. Because the answer to the query at block, 116 of FIG. 5 is NO, the process proceeds to block 122, where the answer to the query is YES, and the process proceeds to block 104. At block 104, the user is prompted to select the "4" indicator on the indicator pad of the native remote control. Assume the native remote control radiates the command code 1010. At block 116, it is determined that the device has been identified, because the command codes corresponding to native remote indicator pad indicators "1", "2", "3" and "4" are consistent with device code D3 only. Therefore command set of device code D3 is programmed into the universal remote control at block 118. If the answer to query 120 is YES, the process proceeds to block 102 and operates in a similar manner for the next native remote control.

Many modifications, variations, and enhancements to the process of FIG. 5 can be made. For example, the type of device may be specified at block 102, for example by a prompt of "Does your home entertainment system have a personal video recorder?" The order in which indicators are prompted or directed to be selected may be determined in a number of ways. For example, the order of indicators may be determined to minimize the number of keystrokes necessary to identify the device code or the order may be determined to prompt or direct the user to a familiar or easily located indicator, or some other order, for example using indicators that are present on as many different devices as possible. There may blocks added to handle other situations, for example if the signal is in a format not understood by the interpreter.

Figure 7A:
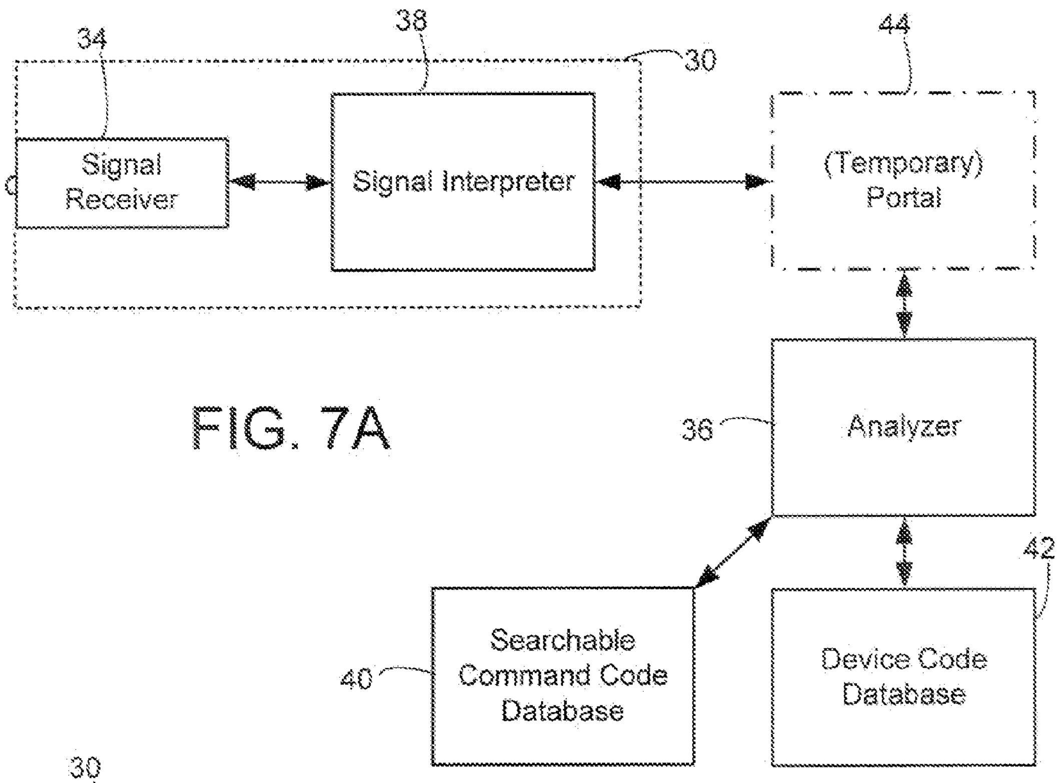
FIGS. 7A-7D are block diagrams of configurations of a universal remote control programmer.

The elements of the universal remote control programmer 32 may be in a single device or may be divided among many devices in many different configurations. FIGS. 7A-7D show some of the configurations. In the configuration, of FIG. 7A, the signal receiver 34 and the signal interpreter signal interpreter 38 are in the same device, such as the universal remote control 30 as shown, or are in separate coupled devices; for example the signal receiver 34 may be a stand alone device or may be in a head unit of an audio system, operatively coupled to the signal interpreter by a wired or wireless link. In the configuration of FIG. 7A, the analyzer 36, the searchable command code database 40 and the device code database 42 are in a different device or devices. The analyzer 36 and the signal interpreter 38 may be coupled by a portal, which may be a temporary or detachable portal 44. In one embodiment, the portal 44 may be a processor, such as a general purpose computer with appropriate connecting circuitry, and the searchable command code database 40 and the device code database 42 may stored, in a device that is accessible by the processor, such as at an internet website. As indicted previously, databases 40 and 42 may be included in the same database.

Figure 7B:
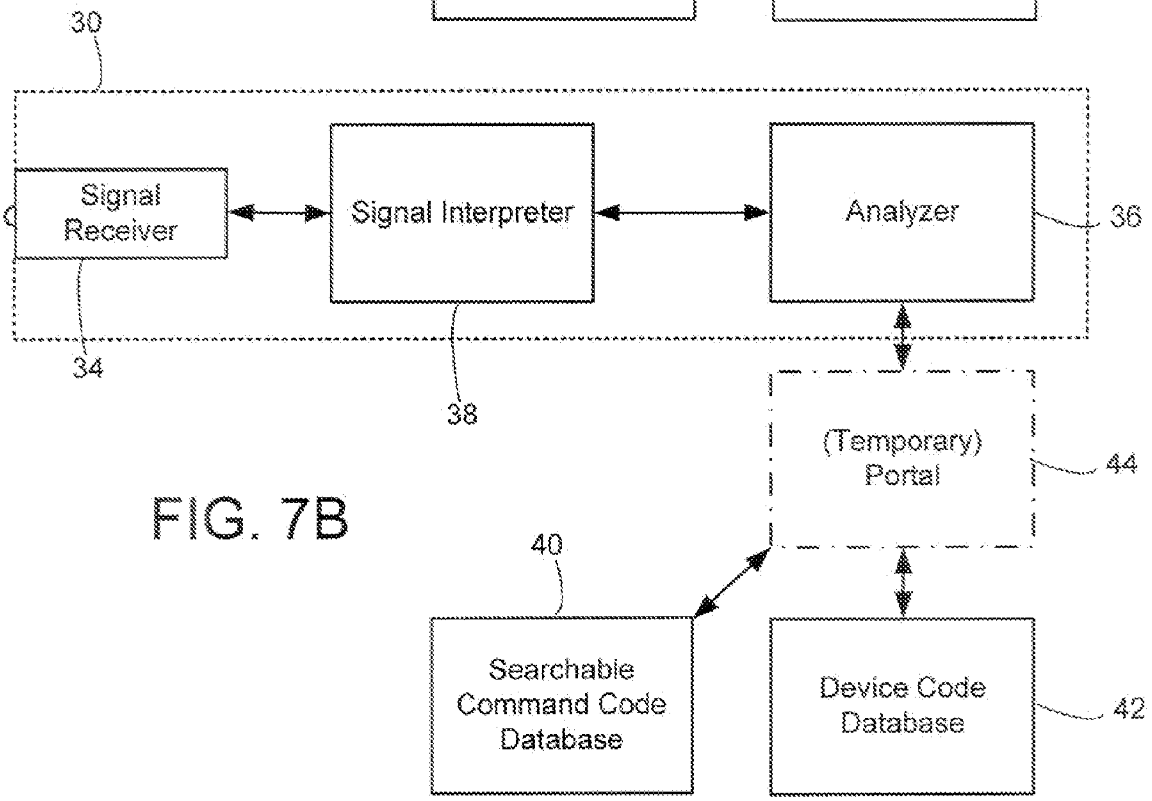

In the configuration of FIG. 7B, the signal receiver 34, the signal interpreter 38, and the analyzer 36 are in the same device, which may be the universal remote control 30, and the searchable command code database 40 and the device code database 42 are in a different device or devices. The analyzer 36 and the databases 40 and 42 may be coupled by a portal 44, which may be a temporary or detachable portal. In one embodiment, the portal 44 may be a processor, such as a general purpose computer with appropriate connecting circuitry and software, and the searchable command code database 40 and the device code database 42 may digitally encoded data stored in a device that is accessible by the processor, such as at an internet website. In the configurations of FIGS. 7A and 7B, the searchable command code database 40 and the device code database 42 may be stored centrally, such as at an internet website and can be updated at the internet website.

Figure 7C:
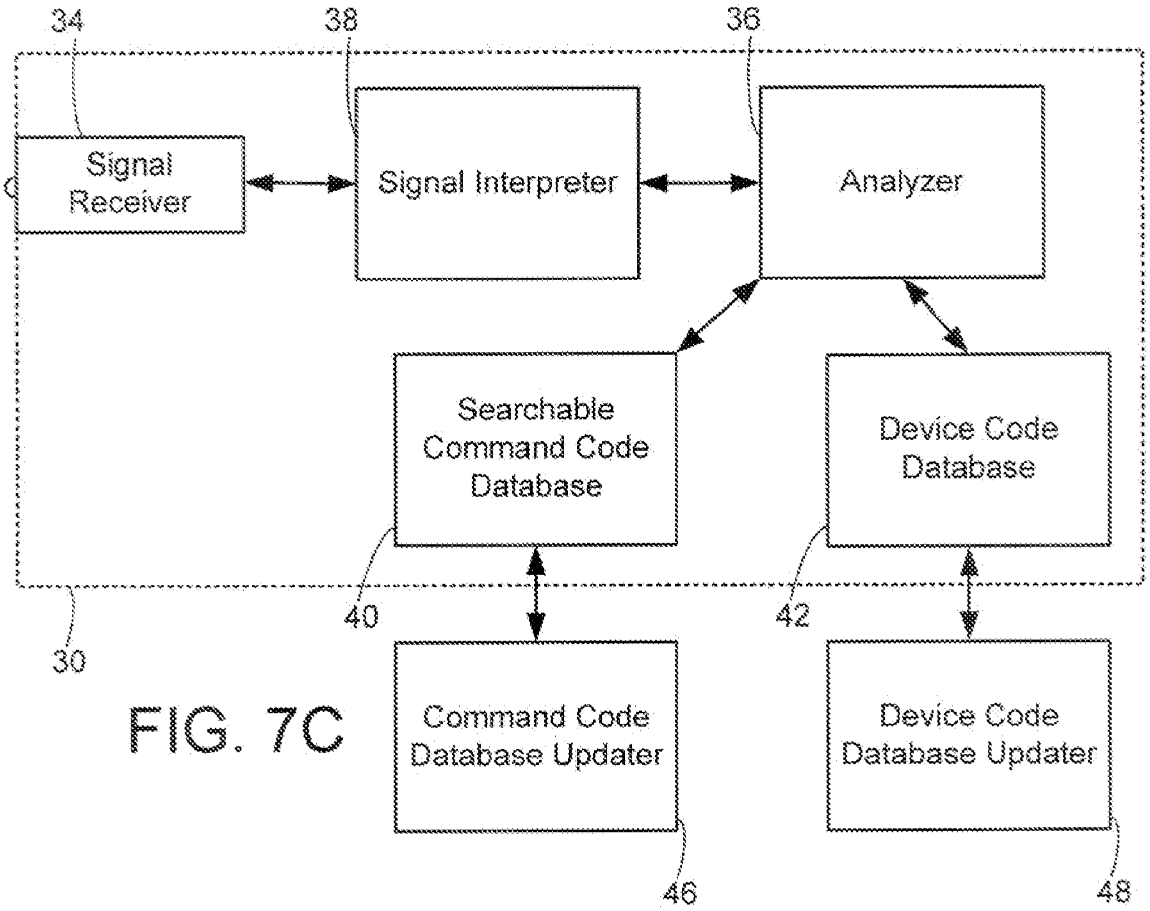

In the configuration of FIG. 7C, the signal receiver 34, the signal interpreter 38, the analyzer 36, and the databases 40 and 42 are in the universal remote control 30. The configuration of FIG. 7C also includes two additional elements, command code database updater 46 and device code database updater 48 coupled to the searchable command code database 40 and the device code database 42, respectively. In the configuration of FIG. 7C the databases are not stored centrally, so any updates to the databases must be done in a manner that permits updates of many dispersed copies of the databases.

Figure 7D:
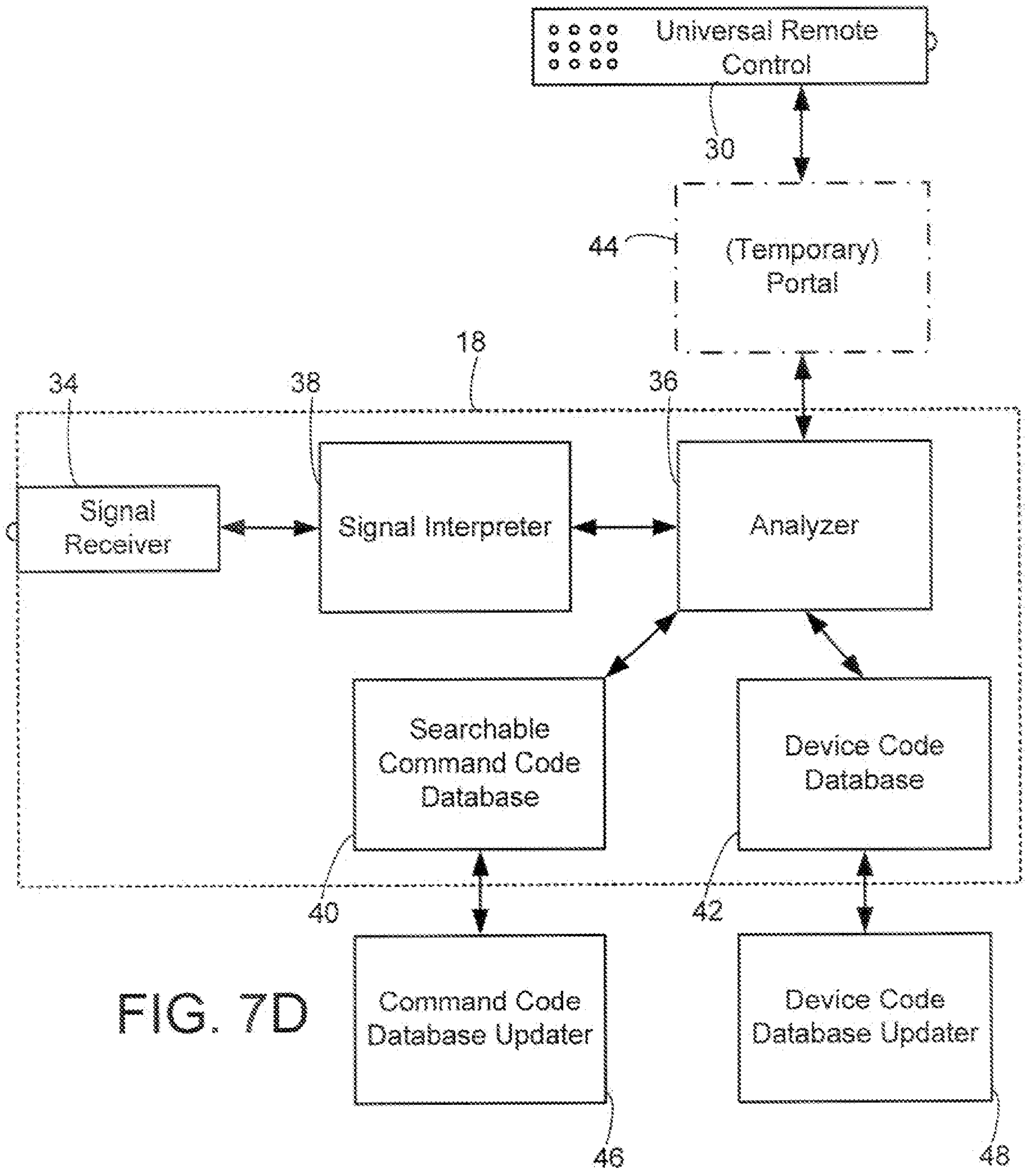

In the configuration of FIG. 7D, the signal receiver 34, the signal interpreter 38, the analyzer 36, and the databases 40 and 42 are in the audio receiver or head unit 18. The interpreting and the analyzing of the IR signals may be performed in the audio receiver or head unit 18, and the command set programmed into the universal remote control 30 through a portal 44, which may be a temporary portal such as a wireless transmitter or a cable detachably coupleable to a USB port in the receiver or head unit 18 or the universal remote control 30, or both. Command code database updater 46 and device code database updater 48 may be coupleable to the searchable command code database 40 and the device code database 42, respectively and may operate in a manner similar to the configuration of FIG. 7C. The configuration of FIG. 7D is advantageous because it can use for the analysis and interpretation a microprocessor that may already be present in the audio receiver or head unit 18 and because it permits the universal remote control to operate with simpler circuitry that consumes less power, to operate with less memory, and to use a simpler, less expensive processor.

Figure 8A:
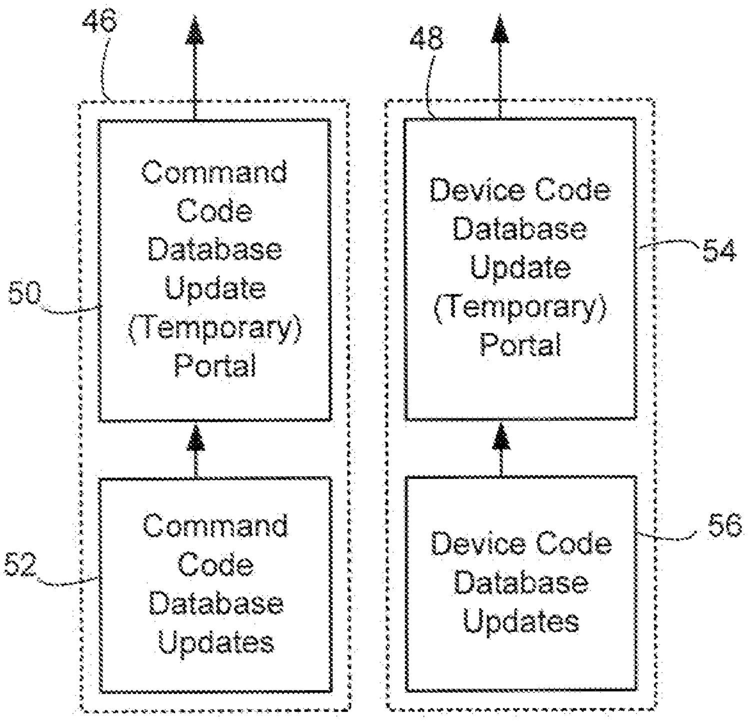
FIGS. 8A and 8B are block diagrams of implementations of a command code database updater.
Figure 8B:
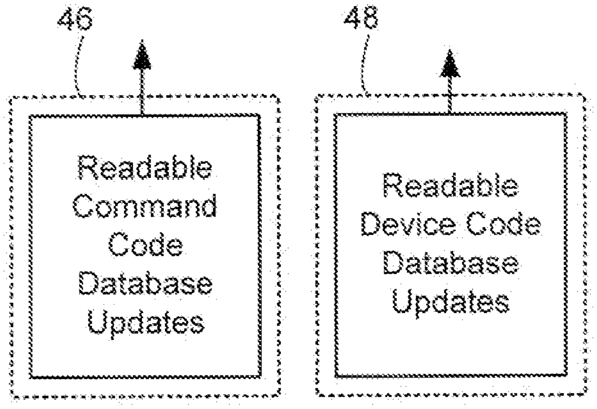

FIGS. 8A and 8B show two implementations of the command code database updater 46 and device code database updater 48. In the implementation of FIG. 8A, the command, code database updater 46 includes a command code database update portal 50 (which may be a temporary portal) and command code database updates 52. Similarly, the device code database updater 48 includes a device code database update portal 54 (which may be a temporary portal) and device code database updates 56.

Portals 50 and 54 may be implemented, for example, as a processor such as a general purpose computer with appropriate connecting circuitry and software and the updates 52 and 56 may be Implemented as digitally encoded data stored in a device that is accessible by the processor, such as an internet website. In another implementation, portals 50 and 54 may be implemented as a microprocessor with appropriate circuitry and software for communicating with a CD drive associated with the home entertainment system, and the updates 52 and 56 may be implemented as digitally encoded data on a CD.

In the implementation of FIG. 8B, the command code database, updater 46 and the device code database updater 48 are implemented in a form that is directly readable by the universal remote control programmer. For example, the updaters 46 and 48 may be implemented as a memory chip, with an appropriate receptacle and software in the device, such as the universal, remote control or an audio system head unit, in which the universal remote control programmer resides.

The operation of the signal interpreter 38 and the command code database 40 will now be discussed using IR signals in the discussion. IR signals are transmitted as alternating periods of infrared radiation (hereinafter "ON periods") and no radiation (hereinafter "OFF periods)." The ON periods may be pulses of radiation at a predetermined carrier frequency. The signal interpreter 38 interprets the IR command signals detected by the signal receiver 34 to provide command codes in a form that can be used by the analyzer 36 to compare with the command code database 40.

Figure 9A:
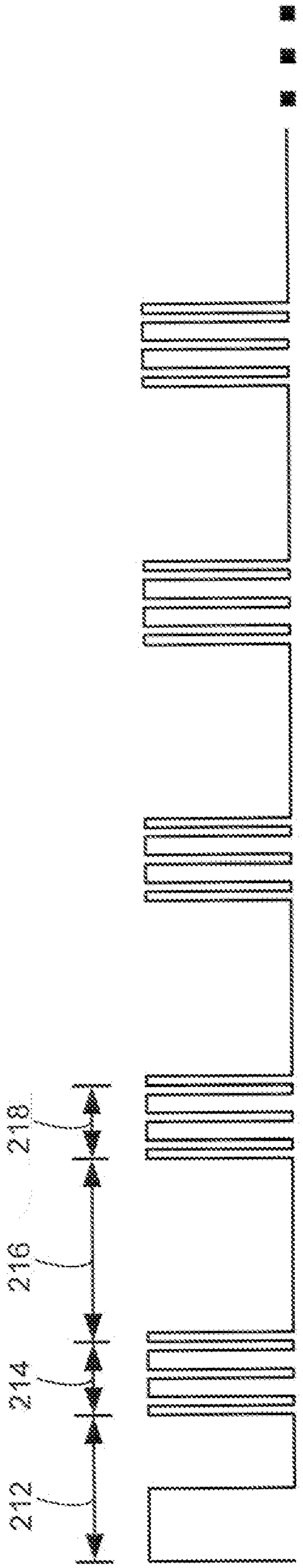
FIGS. 9A-9D are waveforms of IR transmissions.

FIG. 9A shows an example of a typical IR transmission. The IR transmission of FIG. 9A has a leader portion 212, a data portion 214, and an inter-code gap 216. The leader portion is usually a carrier burst (ON period) of from 2 to 10 msec followed by a 2 to 5 msec OFF period. The leader portion permits adjustment of internal control loops in the receiver modules and gives an early warning to the receiver logic to prepare to receive data bits. There are some IR codes in which the leader portion is missing, typically to conserve battery power. The data portion 214 includes the encoded command. There are generally from 8 to 32 data bits, or rarely up to 40 to 56 data bits. The bit times vary from 500 μsec to 2-4 msec. Usually timing tolerance is not required to be better than 10% (since these remotes should work in very noisy environment and should be very inexpensively built). The inter-code gap 216 is a period of time, typically an OFF period, between, successive transmissions (for example a second transmission 218) of the data portion 214. The inter-code gap is usually from 8 to 80 msec long. The successive transmissions of the data portion 214 (which, after the initial data transmission may or may not include the leader portion 212), serves at least two purposes. If an indicator is held down die command may be repeated. For example, if the indicator is the "Volume Up" indicator, the device may continue to increase the volume until the indicator is no longer activated. Some IR command schemes may include redundant information, such as repeating the command multiple times, or add error correction code. The successive transmissions may be smoothed, as will be described below in the discussion of FIG. 11, to lessen the effect of problems illustrated in FIG. 9D.

Figure 9B:
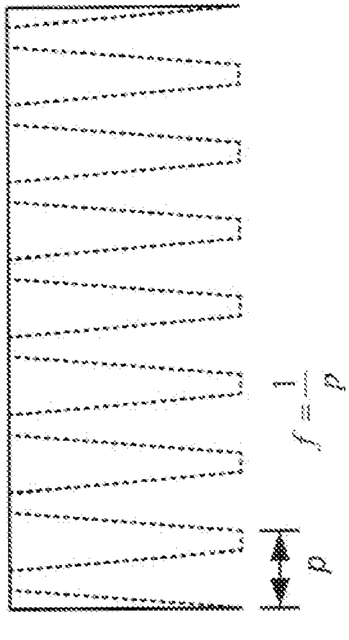

FIG. 9B shows a typical ON period of an IR transmission. In most IR transmission schemes, the ON periods are actually periodic pulses (typically trapezoidal or sinusoidal) with a period p and a corresponding frequency $$f = \frac{1}{p},$$

which is referred to as the "carrier frequency." In a few IR transmission schemes, the remote control continuously radiates IR radiation for the entire ON period. For convenience, in the figures that follow, the ON states are shown as constantly on. In addition, in the figures that follow, the ON periods are shown as square waves.

Figure 9C:
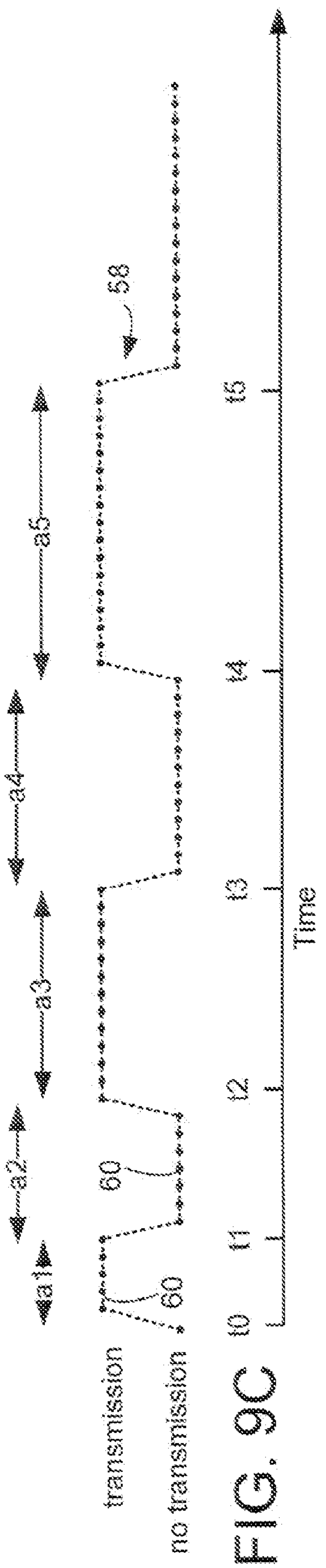

Two methods by which the signal interpreter 38 interprets command signals to provide command codes expressed in a form that can be used by the analyzer 36 to compare with the command code database 40 are shown in FIG. 9C. In one method (hereinafter "oversampling"), the waveform 58 is sampled at times (some of which are indicated by indicators 60) separated by intervals that are short relative to the On/Off periods, so that a command signal represented by waveform 58 and the corresponding command code would be recorded as times and corresponding values. In a second method (hereinafter "run length code"), the On/Off times are recorded; for example transmission is ON at time t0, OFF at time t1, ON at t2, OFF at t3, ON at t4, and OFF at t5. In a variation of run length code, the temporal On and Off intervals are recorded; for example, transmission is ON for interval a1, OFF for Interval a2, ON for interval a3, OFF for interval a4, and ON for interval a5. In this method, a command signal represented by waveform 58 and the corresponding command code would be recorded as a series of ON intervals and OFF intervals.

Figure 9D:
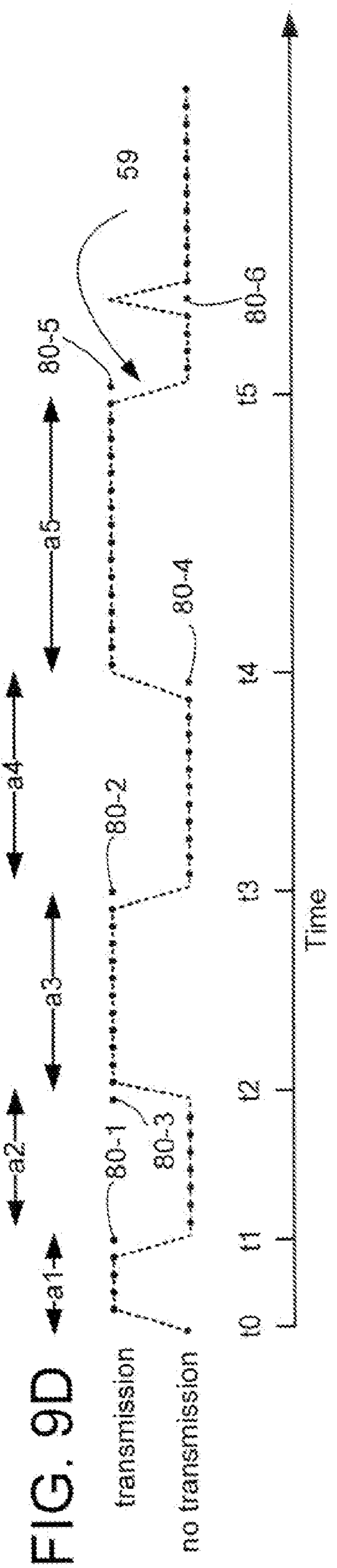

Some problems with these two forms of interpreting command signals are illustrated in FIG. 9D. In FIG. 9D, a waveform 59 that is intended to be identical to waveform 58 of FIG. 9C is shown. At indicators 80-1 and 80-2, the transmitter transitions to an OFF state prematurely. At indicator 80-3, the transition to an ON state is delayed. At indicator 80-4, the transition to an ON state is premature. At indicator 80-5, the transition to an OFF state is premature. At indicator 80-6, there is a noise spike caused, for example by some other IR transmitter, or by ambient light. In addition to the anomalies shown in FIG. 9D, there may be significant variability in the waveform transmitted from different remote controls using the same device code, and even significant variability in the waveforms transmitted by one remote control at different times, and even significant variability between repeat transmission of a command code in the same transmission, so that the On/Off times and intervals vary. The variance of On/Off times makes comparing the detected IR signal with the command code data base difficult. In addition, both of these methods of expressing command codes, especially oversampling, require large amounts of memory for storing large amounts of data in the form of signal samples, time values, and/or time intervals.

A method of interpretation that does not have some of the difficulties of the oversampling and run length code is to interpret command signals to provide command codes expressed in parameters of a modulation technique.

There are many techniques used to modulate IR command signals. Some examples are pulse width, modulation (PWM), bi-phase modulation, pulse position modulation, On-Off key modulation, fixed bit time, and single/double pulse modulation. FIGS. 10A-10E illustrate some modulation techniques. In FIGS. 10A-10E and in the figures that follow, the leader portion 212 of FIG. 9A and the inter-code gap 216 of FIG. 9A are not shown. Only a single data portion 214 of FIG. 9A is shown.

Figure 10A:
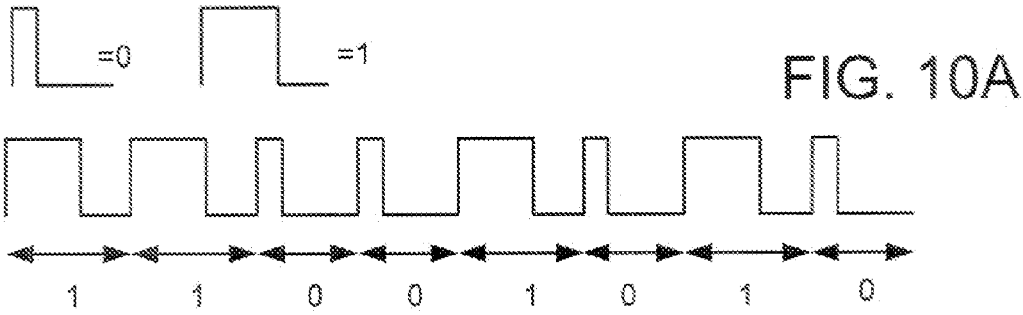

In pulse width modulation, the 0 value and 1 value are differentiated by varying the ON and/or OFF time intervals. With this modulation technique, IR transmission is most often executed by varying the on/off times of an IR emitter to represent binary numbers according to some well established pattern. The length of the IR message varies by its content (except for those codes where Ton0+Toff0=Ton1+Toff1). An example of the sequence 11001010 transmitted using pulse width modulation is shown in FIG. 10A. Parameters used to characterize PWM modulation include carrier frequency, leader information, 0 indicator time on (Ton0), 0 indicator time off (Toff0), 1 indicator time on (Ton1) and 1 indicator time off (Toff1), and inter-code gap time.

Figure 10B:
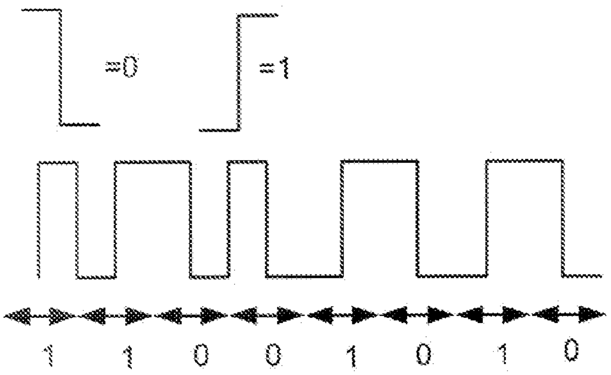

A second modulation technique is known as bi-phase modulation. One popular form of bi-phase modulation standard is referred to as "RC-5/RC-6". In Bi-phase modulation, the length of the bits is the same for "0" and "1" symbols. If in the middle of the bit the carrier is turning on, that represents an "1" value, while if in the middle of the bit the carrier is turningoff, that represents a "0" value. In this modulation, technique the length of each data bit and the length transmitted IR message is always constant independent of the content of the code. An example of the sequence 11001010 transmitted using bi-phase modulation is shown in FIG. 10B.

Figure 10C:
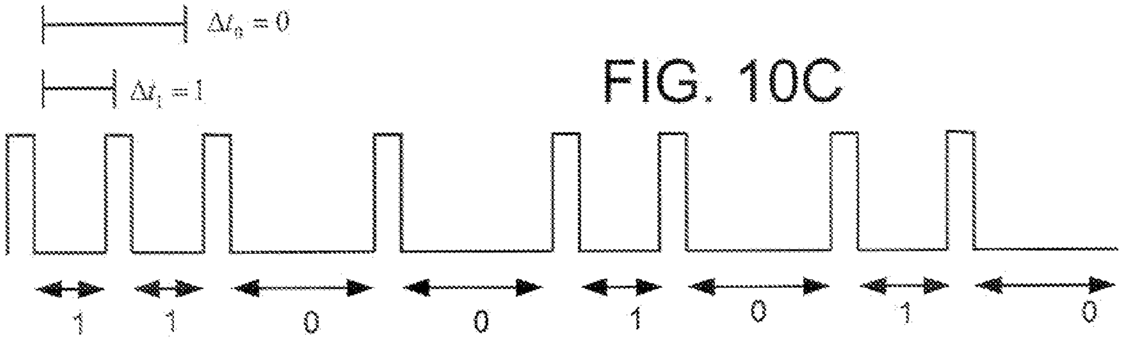

A third modulation technique is Pulse Position Modulation (sometimes called Pulse Distance Modulation). In one method of Pulse Position modulation, called flash mode, IR On time is represented by one single IR pulse—about 15-40 μsec long, and the 0 and 1 values are distinguished by the Off time—about 5 to 12 msec long. In another method of Pulse Position modulation, called modulated mode, pulses of a carrier frequency (for example 6 to 8 pulses at 400 KHz) marks the IR On time. An example of the sequence 11001010 transmitted pulse position modulation is shown In FIG. 10C.

A fourth modulation, technique is fixed bit time, single/double pulse modulation. In fixed bit time, single/double pulse modulation, the bit length is fixed, and the one and zero values are differentiated by the number of pulses in the bit length, for example, one pulse in the bit length represents a "0" value and two pulses in the bit length represents a "1" value. An example of the sequence 11001010 transmitted using fixed bit time, single/double pulse modulation is shown in FIG. 10D.

A fifth modulation technique is called On-Off key modulation. In On-Off key modulation, a 1 value is represented by an Off condition and a 0 value is represented by an On condition (or vice versa). The length of the bits are same for "0" and "1" symbols, therefore, since On-Off key modulation is used almost exclusively for 8 bit commands, the length of the IR message is almost always the same. On-Off key encoding does not have a self-clocking feature and therefore any error in the symbol time can be accumulated so that after a certain number of symbols, the error can be more than one bit and the message can be lost. Typical industry standards call for timing error of <10%, precluding the use of On-Off key modulation for coding more than 10 bits. On-Off coding is almost exclusively used for RS232 signals, which consist of 1 start bit, 8 data bits, and 1 or 2 stop bits. An example of the sequence 11001010 transmitted using On-Off key modulation is shown in FIG. 10E. One characteristic of On-Off Key modulation is that there are, at most, one half the number of On-Off (transmission—no transmission) sequences as there are bits in the command. So if an 8 bit command is modulated using On-Off Key modulation, there are at most 4 On-Off sequences. Other forms of modulation typically have more than 4 On-Off sequences.

Interpreting command signals to provide command codes expressed in terms of a modulation technique is more efficient than interpreting command signals to provide command codes expressed in terms of run-length code or oversampling because it uses much less memory. Only the parameters, the parameter values, and the corresponding indicators need to be stored. For example, storing data for 20 indicators may take as much as 2 Mbits of memory using oversampling or about 20 kBIts using run-length code. Using the techniques described in this specification, data for the same 20 indicators may be stored in only 400 bits, a compression ratio of 5000 compared to oversampling and a compression ratio of 50 compared to run-length code.

Since the modulation technique that was used by the native remote control is not known, either the modulation technique used by the native remote control must be determined, or the signal interpreter 38 and the analyzer 36 must operate in a manner that is independent of the modulation technique used. Two additional desirable features for the interpretation method are (1) facilitating comparing with a database and (2) facilitating unambiguously reproducing the IR signal radiated by the native remote control. It is not necessary that the interpretation method be able to decode the IR signal into 0 or 1 values.

Figure 11:
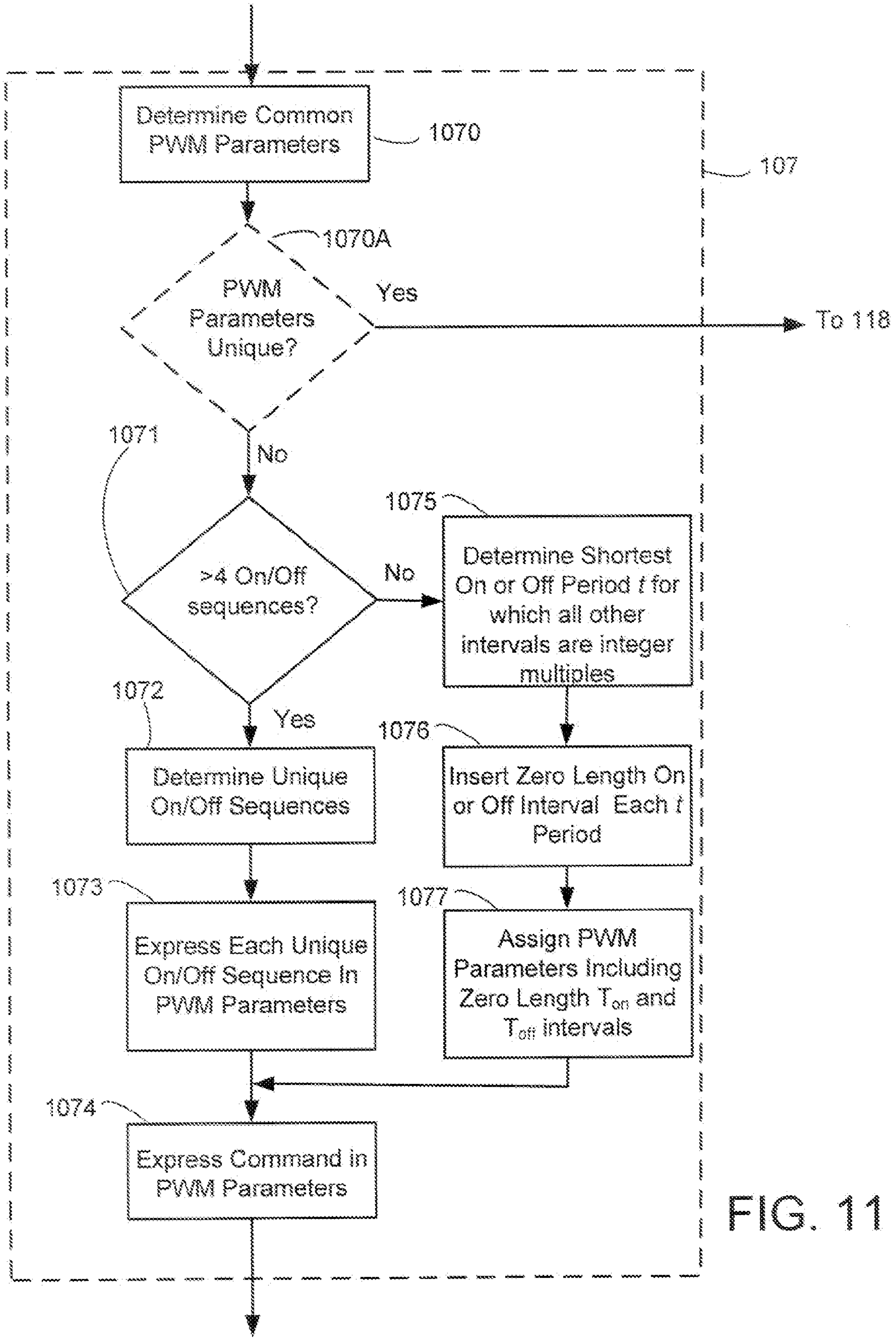
FIG. 11 is an implementation of a block of FIG. 5.

FIG. 11 shows one implementation of interpretation block 107 of FIG. 5 that permits signal interpreter 38 and analyzer 36 to operate in a manner that is independent of the modulation technique used by the native remote control, that facilitates comparing the interpreted signals with a database, and that facilitates unambiguously reproducing IR signals radiated by the native remote control. In the process of FIG. 11, the command waveform is interpreted to provide a command code expressed in PWM terms, regardless of the modulation technique of the native remote control. At block 1070, PWM parameters that are common to all commands in a command set, for example, carrier frequency and duty cycle, leader On time, leader Off time, inter-code gap time, and repeat behavior are determined. At optional block 1070A, it is determined if the common PWM parameters are unique. If the PWM parameters are unique, the process proceeds to block 118 of FIG. 5. If the PWM parameters are not unique (or if block 1070A is omitted) at block 1071, it is determined if there are more than 4 On/Off sequences. If there are more than 4 On/Off sequences, at block 1072, the unique On/Off sequences are determined. At block 1073, each unique On/Off sequence is expressed in PWM parameters. At block 1074, the command is expressed in the PWM parameters. The blocks will be more easily understood from the examples shown in FIGS. 12A-12E.

The process of FIG. 11 may also include comparing the successive transmissions of the data portion 214 of FIG. 9A and smoothing the successive transmissions, for example by averaging or filtering. The smoothing lessens the effect of problems such as those shown in FIG. 9D.

The blocks of FIG. 11 can be executed for each key pressed. In an alternative embodiment, block 1070 is performed only once, because the common parameters are the same for each command on a single remote control.

Blocks 1071, 1075, and 1076 will be explained in the discussion of FIG. 12E.

Figure 12A:
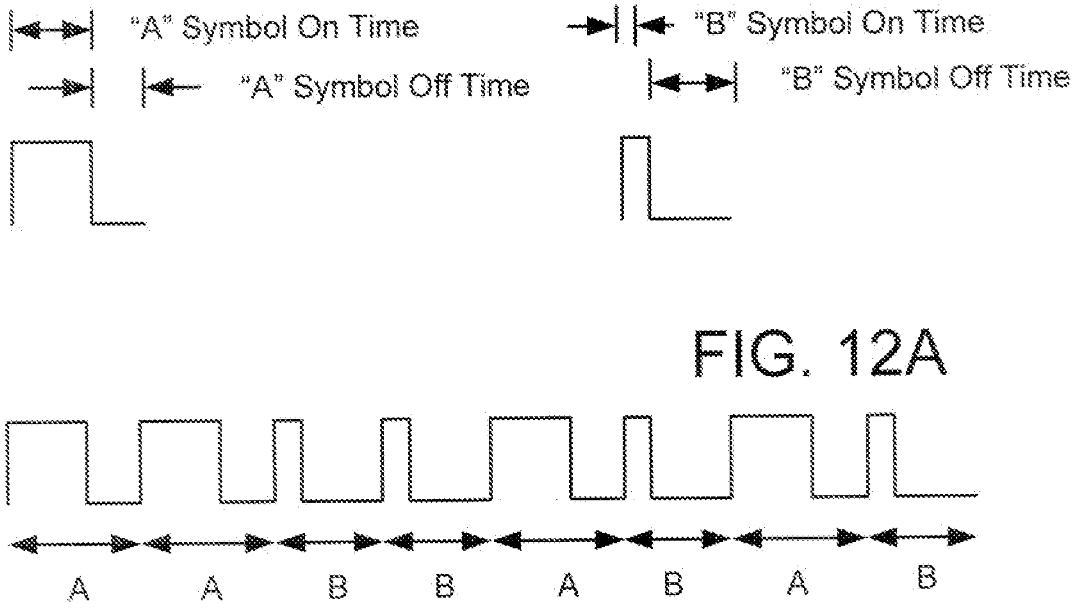
FIGS. 12A-12E are waveforms illustrating the application of the process of FIG. 11 to different modulation techniques.

The application of the process of FIG. 11 to the PWM modulated waveform of FIG. 10A is shown in FIG. 12A. At block 1071 of FIG. 11, it is determined that there are 8 (i.e. more than 4) On/Off sequences. At block 1072, the signal interpreter 38 of FIG. 4 detects two unique On/Off sequences. At block 1073, the two unique On/Off sequences, designated in FIG. 12A as symbols "A" and "B", are expressed in PWM parameters such as the on and off time of each symbol as shown. At block 1074, the command code corresponding to the command signal of FIG. 10A is expressed as AABBABAB. If the universal remote control radiates a command signal corresponding to AABBABAB expressed in PWM parameters (including the common parameters) of FIG. 12B, the resultant IR transmission will be substantially identical to a command signal radiated by the native remote control corresponding to the bit pattern 11001010.

The process of FIG. 11 may be controlled and executed by a microprocessor (that may be a part of the universal remote control 30, in the audio receiver or head unit 18, in some other component of the home entertainment system, or may be locate remotely and coupled to the home entertainment system through a network connection) as instructions in a software program.

Figure 12B:
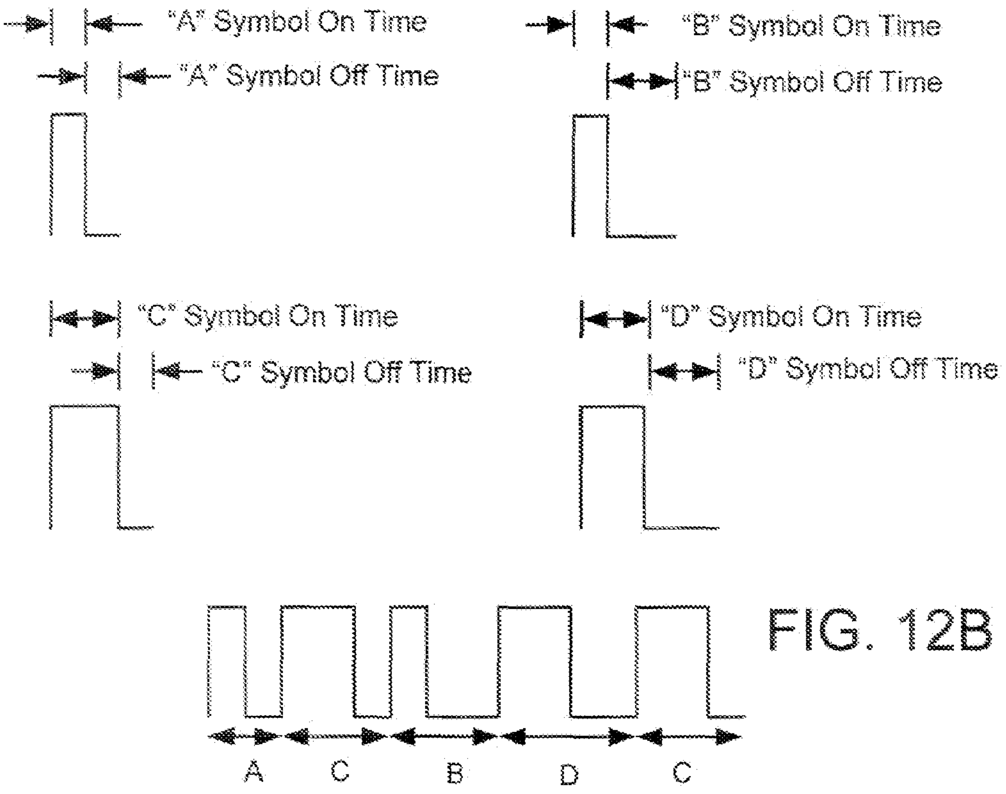

FIG. 12B illustrates the process of FIG. 11 applied to the bi-phase modulated waveform of FIG. 10B. At block 1071 of FIG. 11, it is determined that there are 5 (i.e. more than 4) On/Off sequences. At block 1072, the signal interpreter 38 of FIG. 4 detects four unique On/Off sequences. At block 1073, the four unique On/Off sequences, designated in FIG. 12B as symbols "A", "B", "C", and "D", are expressed in PWM parameters such as the on and off time of each symbol as shown. At block 1074, the command code corresponding to the command signal of FIG. 10B is expressed as ACBDC. The example of FIG. 12B illustrates a principle of the interpretation method. The symbols of the coded sequence of FIG. 12B (ACBDC) has a different number of symbols than the waveform of FIG. 10B (11001010). If the universal remote control radiates a waveform corresponding to ACBDC expressed in PWM parameters (including the common parameters) of FIG. 12B, the resultant IR transmission will be substantially identical to a waveform radiated by the native remote control corresponding to the bit pattern 11001010.

Figure 12C:
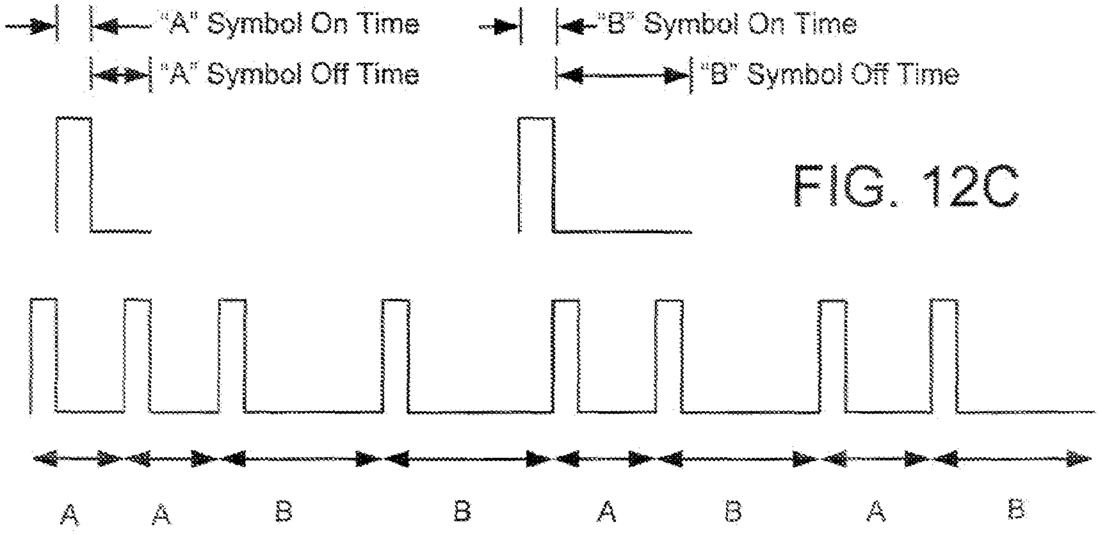

FIG. 12C illustrates the process of FIG. 11 applied to the pulse position modulated waveform of FIG. 10C. At block 1071 of FIG. 11, it is determined that there are 8 (be more than 4) On/Off sequences. At block 1072, the signal interpreter 38 of FIG. 4 detects two unique On/Off sequences. At block 1073, the two unique On/Off sequences, designated in FIG. 12C as symbols "A" and "B", are expressed in PWM parameters such as the on and off time of each symbol as shown. At block 1074, the command code corresponding to the command signal of FIG. 10C is expressed as AABBABAB. The pattern of the resultant coding AABBABAB is similar to the pulse position modulated waveform 11001010, but as noted above, this is not necessarily true with waveforms using other modulation schemes. If the universal remote control radiates a waveform corresponding to AABBABAB expressed in PWM parameters (including the common parameters) of FIG. 12C, the resultant IR transmission will be substantially identical to a waveform radiated by the native remote control corresponding to the bit pattern 11001010.

Figure 12D:
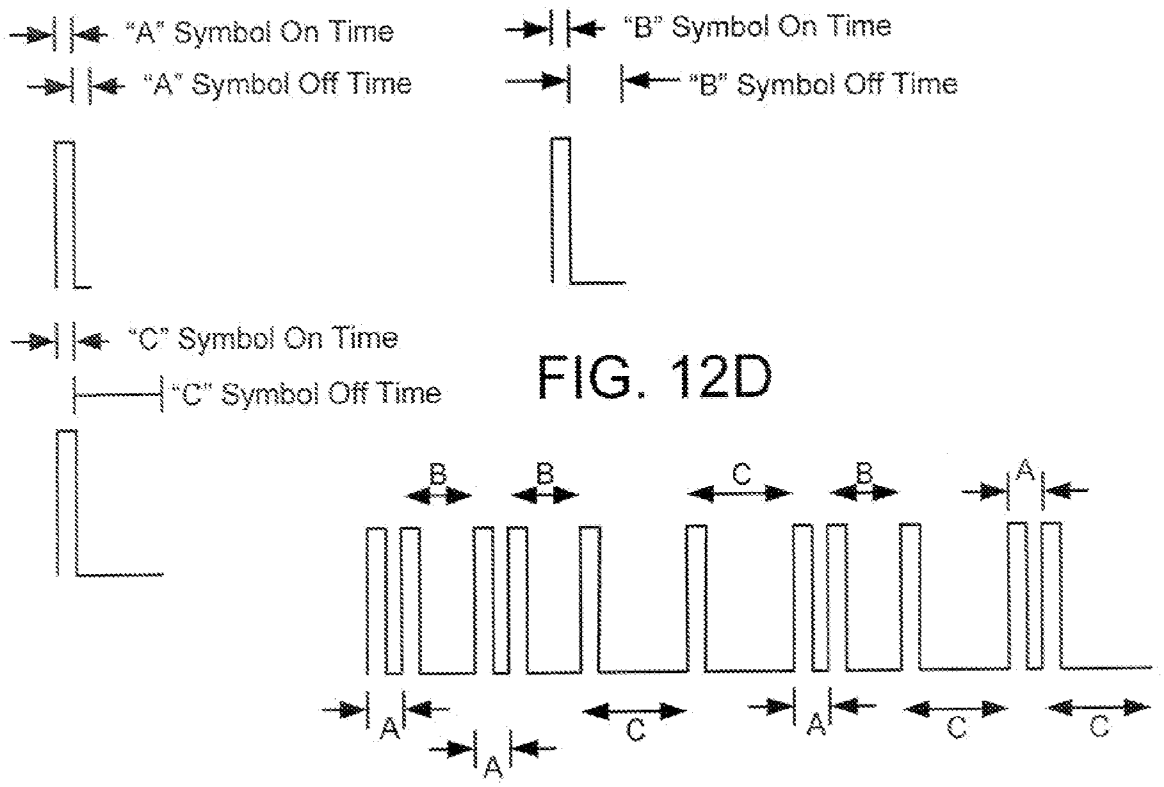

FIG. 12D illustrates the process of FIG. 11 applied to the single/double pulse modulated waveform of FIG. 10D. At block 1071 of FIG. 11, is determined that there are more than 4 On/Off sequences. At block 1072, the signal interpreter 38 of FIG. 4 detects three unique On/Off sequences. At block 1073, the three unique On/Off sequences, designated in FIG. 12B as symbols "A", "B", and "C" are expressed in PWM parameters such as the on and off time of each symbol as shown. At block 1074, the command code corresponding to the command signal of FIG. 10D is expressed as ABABCCABCAC. In this example, the number of symbols in the command code expressed in PWM terms has more symbols than the bit sequence 11001010. However, if the universal remote control radiates a waveform corresponding to ABABCCABCAC expressed in PWM parameters (Including common parameters) of FIG. 12D, the resultant IR transmission will be substantially identical to a waveform radiated by the native remote control corresponding to the bit pattern 11001010.

Figure 12E:
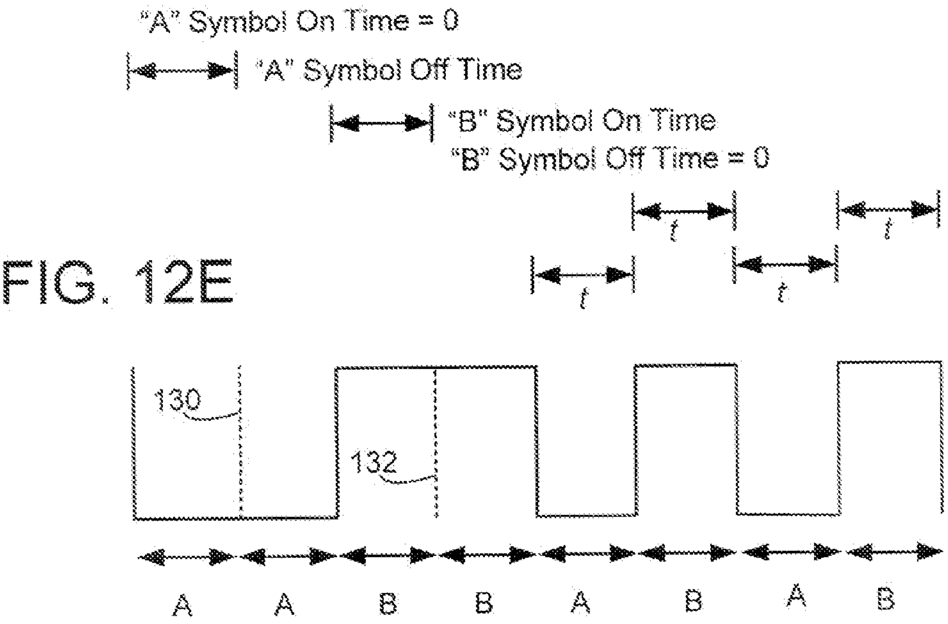

FIG. 12E illustrates the application of the process of FIG. 11 to the On/Off Key modulated waveform of FIG. 10E. At block 1071 of FIG. 11, it is determined that there are four or fewer On/Off sequences and one On with no corresponding off At block 1075, the shortest On or Off period for which all other On or Off intervals are integer multiples is determined. In this example, there are two On periods and two Off periods with the shortest time t and all other On/Off intervals are integer multiples of t. At block 1076. Zero length On or Off intervals are inserted so that all the data hits are time t long. If the preceding period was an On period, a zero length Off interval (indicated by line 130) is inserted. If the preceding period was an Off period, an zero length On interval (indicated by line 132) is inserted. At block 1077, PWM parameters are assigned to the On intervals and Off intervals. For the Off intervals (designated "A" in FIG. 12E), $T_{on}$ is assigned the value zero and $T_{off}$ is assigned the value t. For the On intervals (designated "B" in FIG. 12E), $T_{on}$ is assigned the value t and $T_{off}$ is assigned, the value zero. At block 1074, the command code corresponding to the command signal of FIG. 10E is expressed as AABBABAB. If the universal remote control radiates a waveform corresponding to the PWM parameters (including the common parameters) of FIG. 12E, the resultant IR transmission will be substantially identical to a waveform radiated by the native remote control corresponding to the bit pattern 11001010.

The process of FIG. 11 can also be used to convert databases that are expressed in oversampled or run length code formats to a database expressed in PWM terms. Since the common parameters are the same for all commands in the command set, block 1070 only needs to be determined once. Some blocks of FIG. 11, such as block 1070A, may not be necessary to convert databases. The database expressed in PWM terms can then be used on the process of FIG. 5. Comparison between the received and interpreted IR transmissions can be easily and efficiently done by comparing the PWM parameters.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A method comprising:

directing a user to select a first indicator to radiate a first command signal of unknown modulation technique from a native remote control;

interpreting, by a universal remote control programmer the first command signal to provide a first command code expressed in parameters of a pre-determined modulation technique, the parameters including a carrier frequency;

determining, by the remote control programmer, based on correspondence between the first indicator and the first command code, if a command set of the native remote control can be uniquely identified; and in an event that the command set of the native remote control cannot be uniquely identified directing the user to select a second indicator to radiate a second command signal, wherein the first indicator and the second indicator are selected to minimize a number of indicators necessary to identify the command set of the native remote control;

determining the shortest on period t(on) for which all other on intervals are integer multiples;

inserting a zero length off period for each t(on) period; and determining the shortest off period t(off) for which all other off intervals are integer multiples;

inserting a zero length on period for each t(off) period.

2. The method according to claim 1, further comprising comparing the correspondence between the first command code and the first indicator with a database including command codes expressed in the parameters of the pre-determined modulation technique.

3. The method according to claim 2 wherein the pre-determined modulation technique is pulse-width modulation.

4. The method according to claim 2, wherein the parameters of the pre-determined modulation technique comprise ON and OFF time of a first symbol and ON and OFF time of a second symbol.

* * * * *